Nov. 24, 1925.
A. BROWN
STRAINER
Filed March 19, 1924
1,562,492
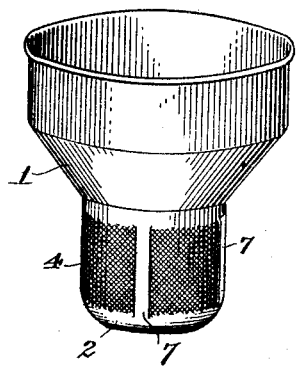
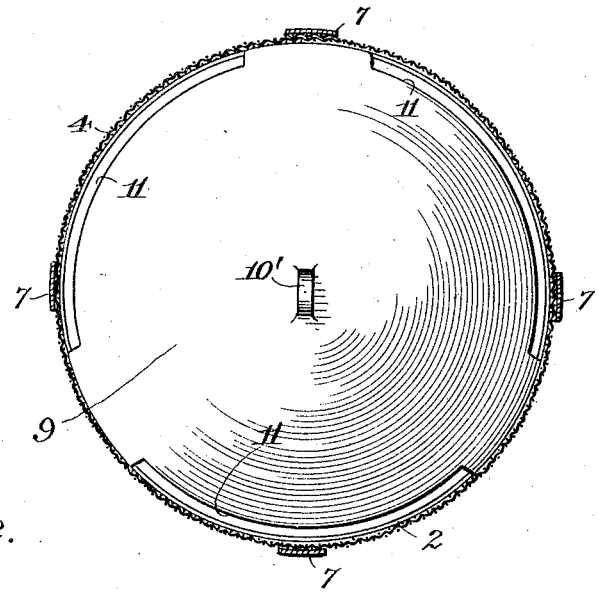
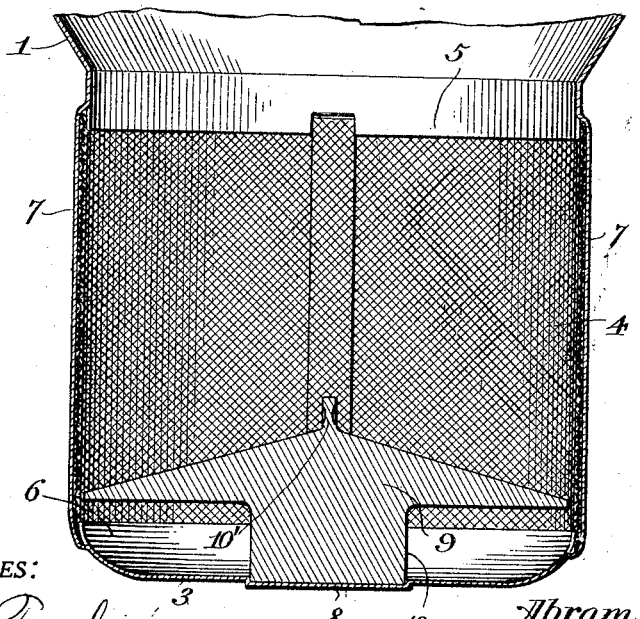
WITNESSES:
INVENTOR,
Abram Brown.
BY
ATTORNEYS.

Patented Nov. 24, 1925.

1,562,492

UNITED STATES PATENT OFFICE.

ABRAM BROWN, OF MAYWOOD, NEW JERSEY.

STRAINER.

Application filed March 19, 1924. Serial No. 700,298.

*To all whom it may concern:*

Be it known that I, ABRAM BROWN, a citizen of the United States, and a resident of Maywood, in the county of Bergen and State of New Jersey, have invented a new and Improved Strainer, of which the following is a full, clear, and exact description.

This invention relates to improvements in strainers, and more particularly to milk strainers, an object of the invention being to provide a strainer which will permit the milk to pass rapidly therethrough and which will function to collect sediment in the bottom of the strainer out of the path of movement of the milk as it is poured into the strainer.

A further object is to provide a strainer in which a sediment trapping device is located in the bottom thereof, over which the milk passes and escapes through the screened side walls of the strainer while the sediment passes under the trapping device and does not interfere with the straining of the milk nor is the milk subjected to passage through the sediment as the sediment is out of the path of the milk.

Strainers in ordinary use very much slow up the operation of milking or disposing of the milk as it is a more or less slow or tedious process to pour the milk through such strainers so that the employees must wait for the slow passage of the milk through the strainer before they can continue with their work. This results either in loss of time or subjects the employee to the temptation of pouring the milk without straining. Furthermore, such strainers collect sediment on the screens or on the material through which the milk is poured and the fresh milk must pass over or through this sediment in its passage, which is not desirable because it checks the flow of the milk and, furthermore, subjects the milk to the contamination thereon. It is, therefore, the purpose of my invention to overcome the difficulties of strainers in former use and permit a rapid pouring of the milk and a collection of sediment out of the way of the milk.

A further object is to provide a strainer which is entirely sanitary, which is simple in construction, and which may be manufactured and sold at a reasonably low price.

With these and other objects in view, the invention consists of certain novel features of construction and combinations and arrangements of parts which will be more fully hereinafter described and pointed out in the claims.

In the accompanying drawing—

Figure 1 is a perspective view illustrating my improved strainer;

Figure 2 is an enlarged view in transverse section through the lower portion of the strainer;

Figure 3 is a view in vertical or longitudinal section through the lower portion of the strainer.

1 represents the upper and 2 the lower portion of my improved strainer. The upper portion 1 is of conventional shape, that is, it is somewhat cylindrical at its upper portion and tapering or inclined at its lower portion so that it may be readily positioned in a can or other receptacle into which the milk is poured.

The lower portion 2 of the receptacle is of appreciably less diameter than the upper portion which is of general cylindrical form and is preferably made with a tapering bottom 3. The walls of the lower portion 2 are cut out, forming openings of suitable size, over which a screen 4 of any desired mesh or of any desired material is located.

A simple and preferable construction is to extend a ring 5 downwardly from the upper portion 1 of the strainer with an upward extension 6 on the bottom 3 and offset bars 7 which separate the openings of the strainer so that the screen 4 may lie against the outside of the extremity of the bottom 3 and ring 5 and against the inner face of the bars 7.

The bottom 3 is preferably made with a downwardly offset socket or pocket 8 at its center, receiving the lower end of my improved baffle 9. This baffle 9 may be of glass, porcelain or any other suitable material not injurious to the milk. The lower portion of the baffle 9 constitutes a standard 10 which is supported on the bottom within the pocket or offset portion 8 and holds the baffle in normal operative position.

The upper or main portion of the baffle is of the same general shape in cross section as the shape of the strainer and fits therein and is provided at its edges with any desired number of segmental recesses 11 through which the sediment can pass to the bottom 3 of the strainer. The upper face of the baffle is preferably tapered from its center downwardly to its outer edge and a handle 10' is preferably provided at the center of the baffle to facilitate its removal when it is desired to clean the same.

In operation, milk poured into the strainer flows rapidly through the screened walls at the side thereof and the sediment which collects on the baffle 9 is carried to the outer edge thereof and flows through the recesses 11 onto the bottom 3 under the baffle so that this sediment is out of the way of incoming milk and does not clog the screen, nor is it necessary for such milk to pass through the sediment to escape.

It is thus apparent that a strainer of this kind will permit a large amount of milk to rapidly flow through the strainer and will, therefore, enable the employees to rapidly dispose of their milk as it comes from the cows thus saving time. Furthermore, the milk will be more perfectly strained because the sediment is out of the way. Furthermore, the device is entirely sanitary as the baffle 9 can be removed and the sediment disposed of as occasion may require.

Various slight changes and alterations might be made in the general form of the parts described without departing from my invention, and hence I do not limit myself to the precise details set forth but consider myself at liberty to make such slight changes and alterations as fairly fall within the spirit and scope of the appended claims.

I claim:

1. A strainer, comprising a receptacle having a closed bottom and having screened outlets in its side walls, a removable portable baffle located in the strainer and having a central post supported on the bottom of the strainer and providing an annular space around the post for the collection of sediment under the baffle, the upper face of said baffle of general conical shape.

2. A strainer, comprising a receptacle having a closed bottom and having screened outlets in its side walls, a removable portable baffle located in the strainer and having a central post supported on the bottom of the strainer and providing an annular space around the post for the collection of sediment under the baffle, the upper face of said baffle of general conical shape, said baffle of substantially the same interior diameter as the strainer and having recesses at its edges through which the sediment passes onto the bottom of the strainer under the baffle.

3. A strainer, comprising a receptacle having screened outlets in its side walls, a closed bottom on the strainer, a central depression in the bottom, a baffle fitting the strainer and having a lower extension of reduced diameter fitting the recess in the bottom, and said baffle having recesses in its side walls for the passage of sediment onto the bottom.

4. A strainer, comprising upper and lower portions, a closed bottom on the lower portion, the walls of said lower portion having openings therein, a downwardly projecting ring on the upper portion, bars fixed to the rings and the bottom and offset from both, a screen located around the ring and the bottom and inside of the bars, and a sediment baffle removably located on the bottom.

ABRAM BROWN.